United States Patent [19]

Narita et al.

[11] Patent Number: 5,970,027
[45] Date of Patent: Oct. 19, 1999

[54] MAGNETO-OPTICAL RECORDING MEDIUM AND WRITING AND READOUT METHOD THEREFOR

[75] Inventors: Kyuuya Narita; Toshifumi Kawano; Hideharu Takeshima, all of Yokohama; Masanobu Hodohara, Kurashiki, all of Japan

[73] Assignee: Mitsubishi Chemical Corporation, Tokyo, Japan

[21] Appl. No.: 09/122,799

[22] Filed: Jul. 27, 1998

[30] Foreign Application Priority Data

Jul. 28, 1997 [JP] Japan ............................ 9-201196

[51] Int. Cl.$^6$ .................................................... G11B 11/00
[52] U.S. Cl. .................................................... 369/13
[58] Field of Search ........................... 369/13, 14, 275.4, 369/275.2, 110, 116; 360/59, 114; 365/122

[56] References Cited

U.S. PATENT DOCUMENTS

| | | | |
|---|---|---|---|
| 5,414,652 | 5/1995 | Mieda et al. .............................. | 369/13 |
| 5,499,229 | 3/1996 | Murakami et al. ....................... | 369/13 |
| 5,640,374 | 6/1997 | Hirokane et al. ......................... | 369/13 |
| 5,659,537 | 8/1997 | Hirokane et al. ......................... | 369/13 |
| 5,784,347 | 7/1998 | Miyamoto et al. ....................... | 369/54 |
| 5,831,942 | 11/1998 | Morimoto et al. ....................... | 369/13 |
| 5,852,591 | 12/1998 | Fukumoto ................................. | 369/13 |

OTHER PUBLICATIONS

Kyuya Narita, et al, "Feasibility Study of High Density Land/Groove Recording on Magnetooptical Disks", Jpn. J. Appl. Phys., vol. 36, Part 1, No. 1B, Jan. 1997, pp. 495–499.

*Primary Examiner*—Tan Dinh
*Attorney, Agent, or Firm*—Oblon, Spivak, McClelland, Maier & Neustadt, P.C.

[57] ABSTRACT

A magneto-optical recording medium having a writing layer formed on a transparent substrate provided with a groove having a flat bottom surface and a flat land, so that writing or readout is carried out on either the groove or the land only by irradiating a laser beam from the substrate side, wherein the sum ($\alpha+\beta$) of a phase shift $\alpha$ of a reflected light of a readout beam by the substrate and a phase shift $\beta$ thereof by a layer structure on the transparent substrate, is made to have an opposite sign to a phase shift $\gamma$ by interference of reflected lights from the groove and the land.

14 Claims, 10 Drawing Sheets

MAGNETO-OPTICAL RECORDING MEDIUM AND WRITING AND READOUT METHOD THEREFOR

The present invention relates to a magneto-optical recording medium.

Magneto-optical recording media are rewritable information recording media with large capacities and of low costs and widely used as e.g. magneto-optical (MO) disks to be used for external memories apparatus for computers, or MD (Mini Disks) to be used for e.g. recording musics.

In recent years, along with an increase of the quantity of information of the society, large capacity modification and high densification are desired. Among various methods studied for improving the recording density of information, narrow track pitch modification to increase the track density by reducing the track pitch of recording tracks, is one of the most effective methods.

A track of a magneto-optical recording medium is formed usually along a groove formed spirally or concentrically, and an optical pick up for writing and readout carries out tracking servo based on a servo signal obtained by a diffracted light from this groove. Namely, the optical pick up scans to follow either the groove or the land to carry out writing or readout along the groove.

Conventional magneto-optical disks are provided with grooves formed spirally to have a cross section of letter V with a depth of about $\lambda/8n$, whereby a servo signal is obtained by a reflected light from the groove to carry out writing of a signal on the groove. Here, $\lambda$ is the wavelength of the readout laser beam in air and hereinafter represents a value in air unless otherwise specified, and n is the refractive index of the substrate. To prepare a stamper for production of substrates, a photoresist is coated on a glass plate and exposed by a laser beam. In order to obtain a V-shaped groove, the exposure used to be carried out with such a light intensity that the photoresist was sensitized halfway in its thickness.

In such a case, the amplitude of the servo signal becomes large as the ratio of the width of the land to the width of the groove is close to 1:1, and it becomes large as the groove depth is deep (close to $\lambda/4n$).

The above mentioned narrow track pitch modification is an effective method for accomplishing a higher recording density, but if the track pitch is simply narrowed, the width of the land or groove on which writing is carried out, is reduced, whereby the signal intensity for readout decrease.

Accordingly, for example, in a case where the land is used as a writing track, it is necessary to narrow the width of the groove as much as possible to secure a large width for the land. Further, in order to obtain a sufficient servo signal even when the width of the groove is narrowed, it is necessary to make the groove depth deep so that it becomes close to $\lambda/4n$.

However, it is technically very difficult to form a narrow and deep V-shaped groove, and consequently, the intensity of the servo signal tends to be low, and tracking tends to be unstable.

To solve such a problem, it has been proposed to form a groove so that its cross sectional shape has a flat bottom surface, i.e. to form a groove as a rectangular groove. In this case, reflected lights from the groove and the land will interfere very efficiently, so that it is possible to obtain a good servo signal even if the width of the groove is narrow as compared with the above mentioned V-shaped groove. Accordingly, a narrow track pitch is realized as compared with the V-shaped groove.

Further, in the case of the V-shaped groove, it was common to prepare it by sensitizing a photoresist halfway, as mentioned above. Accordingly, fine irregularities due to photoresist particles were formed in the groove, and such irregularities will cause a noise in the readout signal. By making the groove to be a rectangular groove, the bottom of the groove will be substantially completely flat, whereby a noise in the readout signal can remarkably be reduced.

On the other hand, in magneto-optical disks, a problem of elliptic modification of a reflected light attributable to the layer structure or birefringence of the substrate, has heretofore been pointed out. When a linearly polarized light is introduced to a magneto-optical disk, the reflecting polarized light will contain an incident direction component (hereinafter referred to as P-wave) and a component in a direction vertical to the incident light (hereinafter referred to as S-wave).

Here, one to be changed by the magnitization direction is the vertical direction component. Information is detected by the inclination (Kerr rotation angle) of the plane of polarization having both components combined.

Here, if there is a difference in phase between the P-wave and the S-wave, the reflected light undergoes elliptic modification, whereby the Kerr rotation angle will decrease. This difference in phase between the P-wave and the S-wave will be hereinafter referred to as "a phase shift". This elliptic modification may occur by reflection by the magnetic layer itself or by multiple reflection inclusive of reflection by the interference layer and the reflective layer, or it may occur in a case where the transparent substrate of a magneto-optical recording medium has a birefringence. Further, the drive used may create a phase difference between the P-wave and the S-wave, whereby the elliptic modification may further be increased.

To prevent such a problem, with a conventional magneto-optical recording medium having a V-shaped groove, an attempt has been made for adjustment so that a phase shift $\alpha$ caused by the birefringence of the substrate and a phase shift $\beta$ caused by the layer structure on the substrate will cancel out each other, or to bring both of them as close as possible to 0 degree.

However, here, we have found that in a case where both the groove and the land have flat portions, as mentioned above, a new elliptic modification in the reflected light occurs attributable to the presence or absence of the groove.

The mechanism of this occurrence will be described with reference to the drawings.

FIG. 1 is a view illustrating the mechanism of formation of a phase shift $\gamma$ in a case where writing is carried out on a groove portion of a rectangular groove, wherein a groove 1 and a land 2 are formed on a substrate 3, and a readout laser beam 4 is irradiated. The width of the land is represented by $W_L$, the width of the groove by $W_G$, the depth of the groove by $d_G$, and the diameter in a radial direction of the spot of the readout laser beam by S. Here, the spot is meant for a region with at least $1/e^2$ of the peak intensity of the laser beam.

In such a groove structure, reflected lights from both the land and the groove are directed in the same direction. Between the groove and the land, there is a difference in the optical path length by $2d_G$ due to the groove depth $d_G$, whereby interference occurs between the two reflected lights, and a substantial phase shift occurs in the P-wave.

Whereas, the writing signal component in the S-wave formed by a magneto-optical effect of the magnetic layer, receives no such interference, since it is generated from only either one of the groove or the land, on which writing is carried out. As a result, a substantial phase difference attributable to the groove, occurs between the p-wave and the S-wave. This phase difference will be hereinafter referred to as γ. Due to this phase difference γ, the signal intensity decreases, and the signal-to-noise ratio (CNR) characteristics will be impaired.

Namely, with a magneto-optical recording medium having a rectangular groove, it is difficult to prevent deterioration of the CNR characteristics simply by bringing α+β close to 0 degree.

The present invention has been made in view of the above mentioned problem which has been discovered by us, and it is an object of the present invention to provide a magneto-optical recording medium having a large capacity, whereby deterioration of the CNR characteristics can be reduced, and a writing and readout method therefor.

The present inventors have found it possible to accomplish the above object by bringing the overall phase shift close to 0 taking into consideration also the phase shift γ attributable to the groove.

Namely, in a case where a light is irradiated from the substrate side, a phase shift α by the substrate and a phase shift β by the layer structure, and a phase shift γ attributable to the groove, are adjusted so that the overall phase shift is brought close to 0.

Likewise, in a case where a light is irradiated from the writing layer side (which hereinafter may sometimes be referred to as a film surface side), a phase shift β by the layer structure and a phase shift γ attributable to the groove may be adjusted so that the overall phase shift is brought close to 0.

Thus, the present invention provides a magneto-optical recording medium having a writing layer formed on a transparent substrate provided with a groove having a flat bottom surface and a flat land, so that writing or readout is carried out on either the groove or the land only by irradiating a laser beam from the substrate side, wherein the sum (α+β) of a phase shift α of a reflected light of a readout beam by the substrate and a phase shift β thereof by a layer structure on the transparent substrate, is made to have an opposite sign to a phase shift γ by interference of reflected lights from the groove and the land.

Further, the present invention provides a writing and readout method for a magneto-optical recording medium having a writing layer formed on a transparent substrate provided with a groove having a flat bottom surface and a flat land, wherein writing is carried out on either the groove or the land only, and the sum of a phase shift of a reflected light by a layer structure on the transparent substrate and a phase shift of a reflected light by the substrate, is made to have an opposite sign to a phase shift by interference of reflected lights from the groove and the land, and wherein a readout laser beam is used which satisfies Wa≦S, where Wa is the width of the flat portion of the groove or the land on which writing is carried out, and S is the diameter in a radial direction of the spot of a readout laser beam (here the spot is meant for an area with at least 1/e² of the peak intensity of the laser beam).

The present invention also provides a magneto-optical recording medium having a writing layer formed on a substrate provided with a groove having a flat bottom surface and a flat land, so that writing or readout is carried out on either the groove or the land only by irradiating a laser beam from the writing layer side, wherein a phase shift β of a reflected light of a readout beam by a layer structure on the substrate, is made to have an opposite sign to a phase shift γ by interference of reflected lights from the groove and the land.

Further, the present invention provides a writing and readout method for a magneto-optical recording medium having a writing layer formed on a substrate provided with a groove having a flat bottom surface and a flat land, wherein writing is carried out on either the groove or the land only, and a phase shift of a reflected light by a layer structure on the substrate, is made to have an opposite sign to a phase shift by interference of reflected lights from the groove and the land, and wherein a readout laser beam is used which satisfies Wa≦S, where Wa is the width of the flat portion of the groove or the land on which writing is carried out, and S is the diameter in a radial direction of the spot of a readout laser beam (here the spot is meant for an area with at least 1/e² of the peak intensity of the laser beam).

Now, the present invention will be describe in detail with reference to the preferred embodiments.

Firstly, a case wherein a light is irradiated from the substrate side, will be described.

The magneto-optical recording medium of the present invention is characterized in that the overall phase shift as the entire medium is reduced by bringing α+β+γ close to 0, for example, by positively increasing the sum of phase shifts α+β, as opposed to the conventional practice, and making the sign opposite to the phase shift γ.

Here, the method for measuring the phase shift according to the present invention, will be described. A phase shift formed by an optical system for measurement (a pick up) is varied by means of e.g. a Babinet-Soleil compensator to obtain a phase shift at which the readout intensity (carrier level) of a writing signal takes the maximum value. Namely, in a case where the carrier level is maximum when the phase shift of the optical system is +10 degree, the phase shift attributable to the disk can be judged to be −10 degree.

Figure 2:
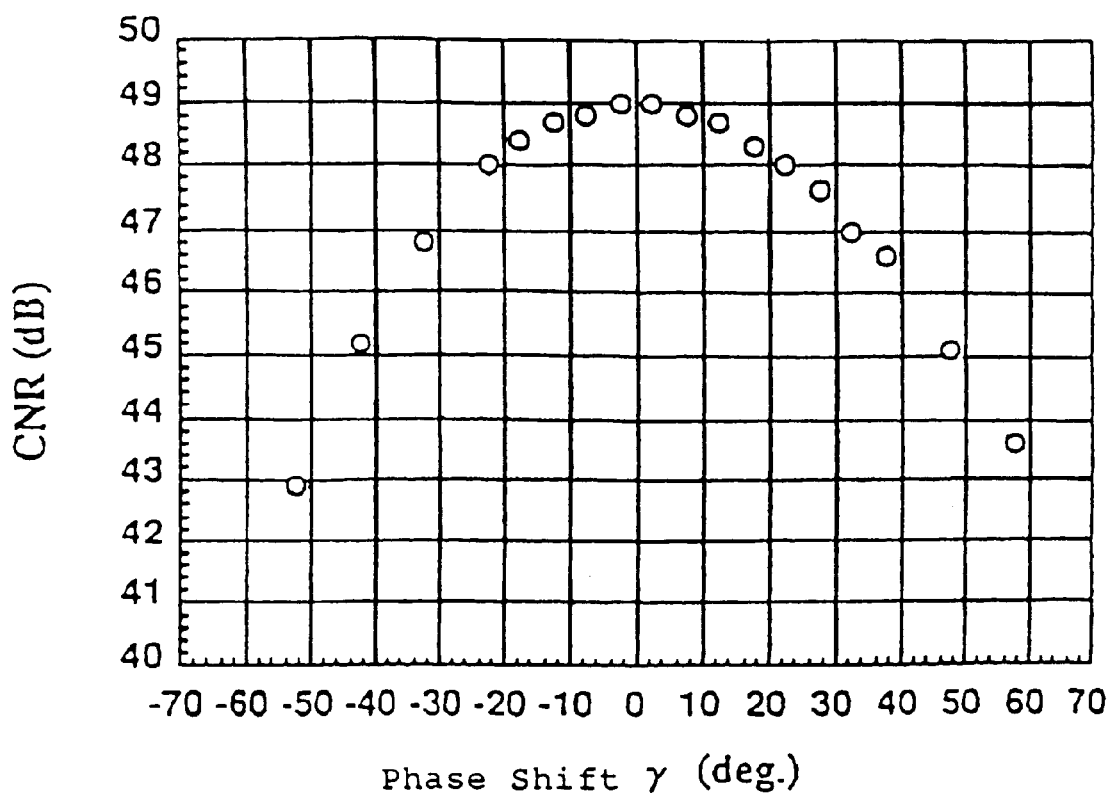
FIG. 2 is a view showing the dependency of CNR on the phase shift of an optical pick up.
Figure 3:
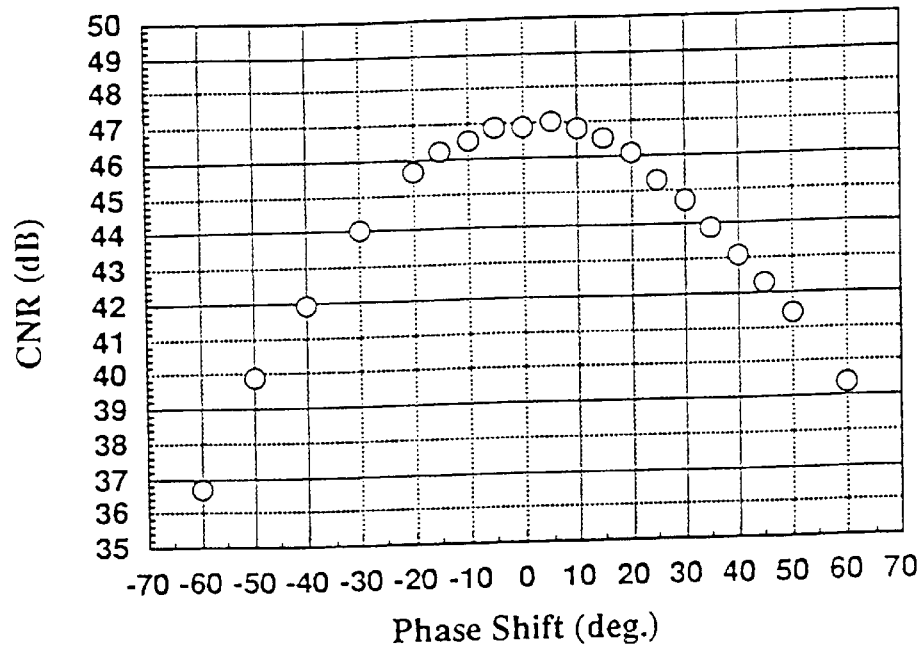
FIG. 3 is a view showing the dependency of CNR on the phase shift of an optical pick up of Example 2.
Figure 4:
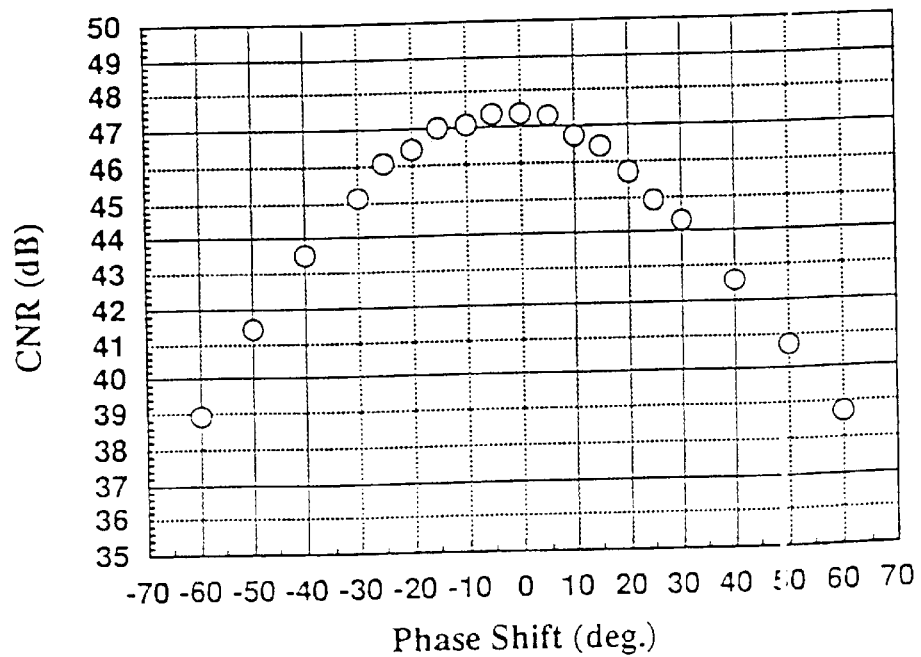
FIG. 4 is a view showing the dependency of CNR on the phase shift of an optical pick up of Example 3.
Figure 5:
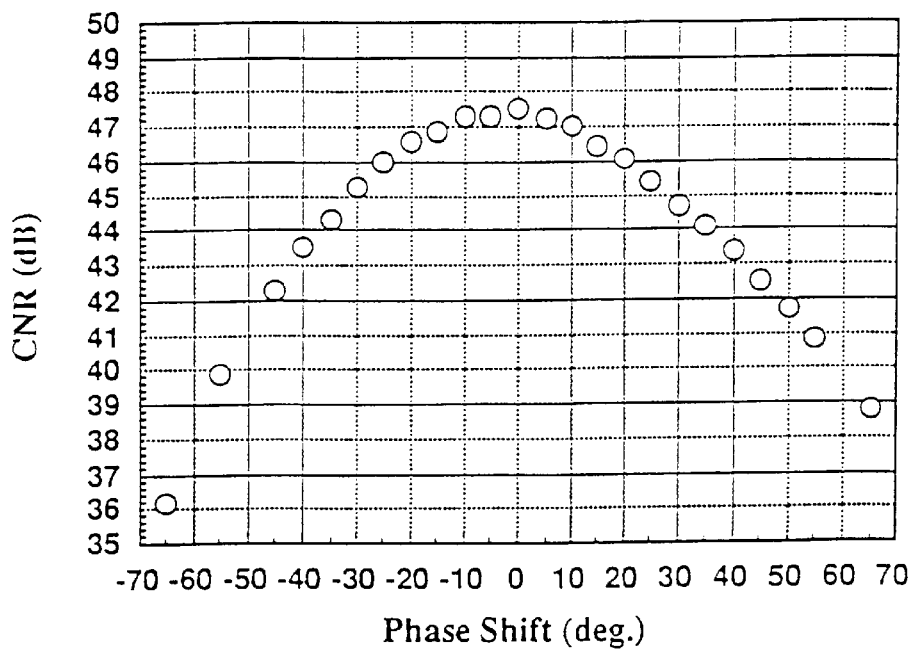
FIG. 5 is a view showing the dependency of CNR on the phase shift of an optical pick up of Example 4.
Figure 6:
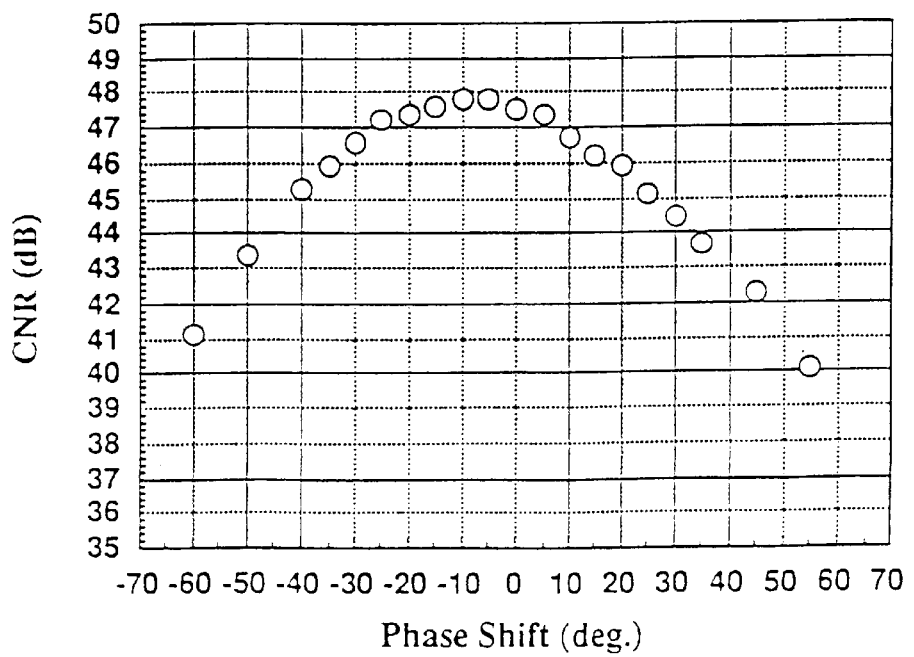
FIG. 6 is a view showing the dependency of CNR on the phase shift of an optical pick up of Example 5.
Figure 7:
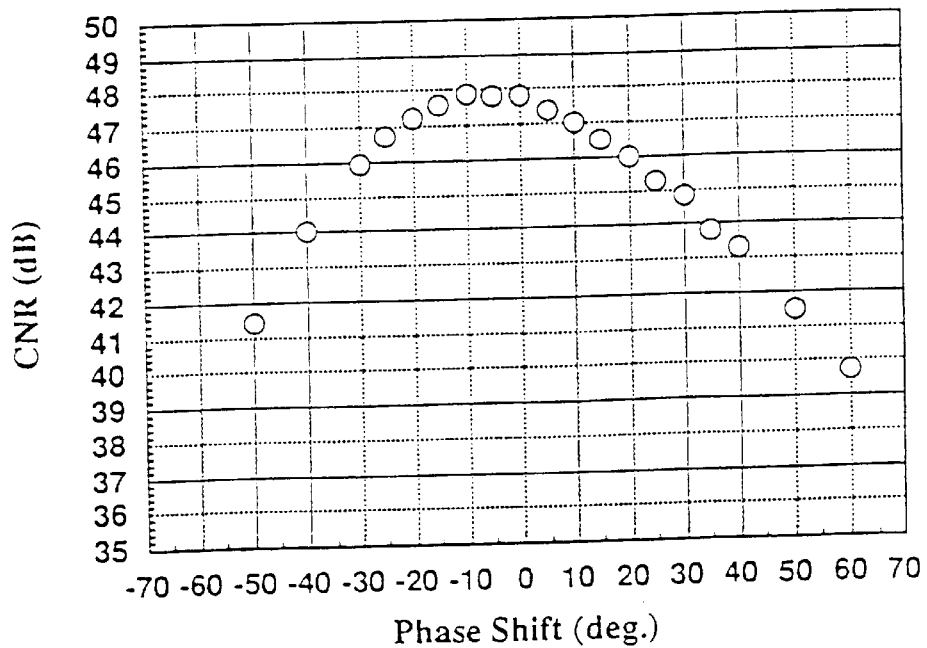
FIG. 7 is a view showing the dependency of CNR on the phase shift of an optical pick up of Example 6.
Figure 8:
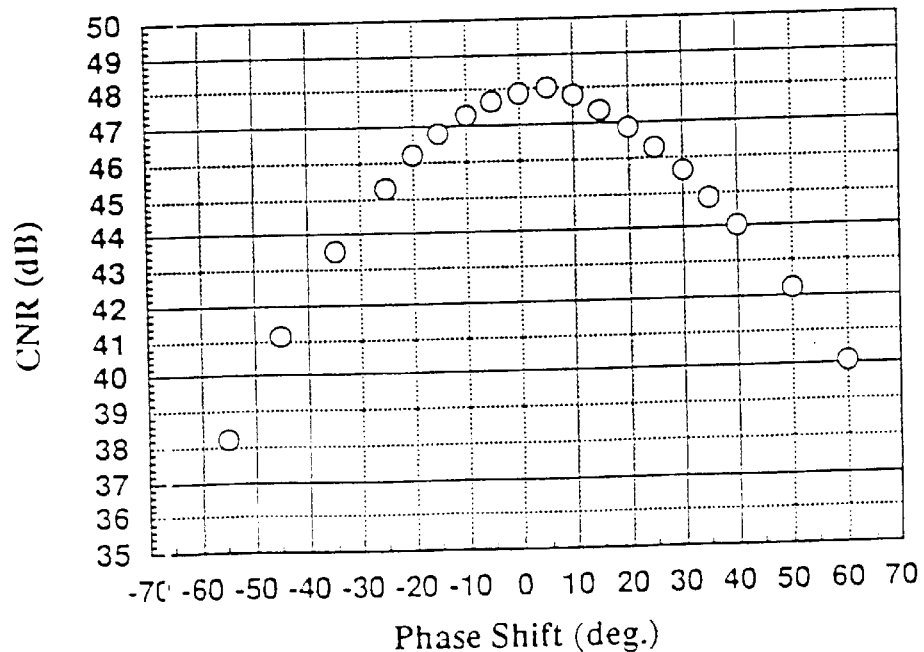
FIG. 8 is a view showing the dependency of CNR on the phase shift of an optical pick up of Example 7.
Figure 9:
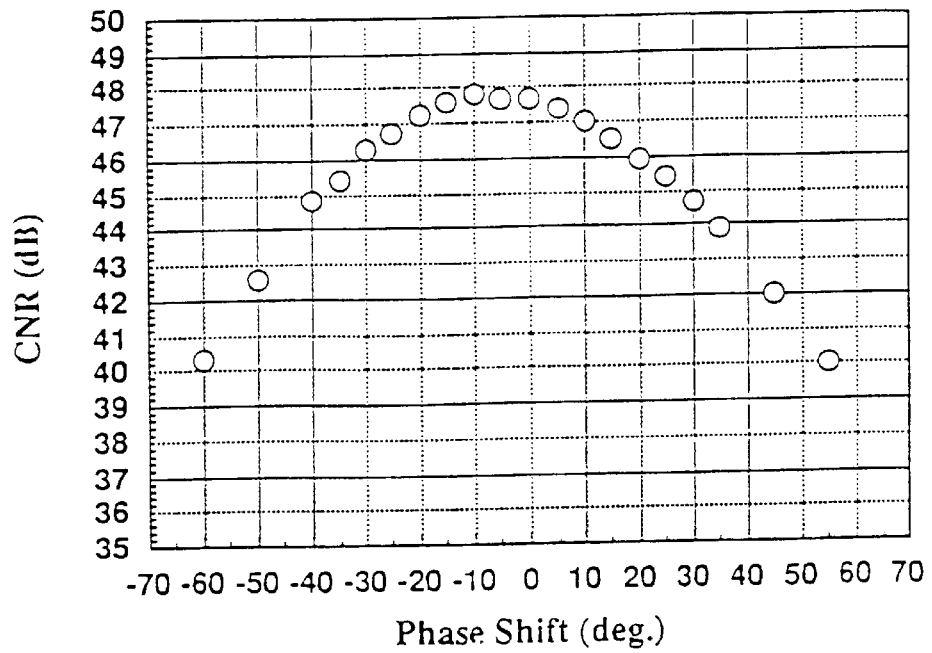
FIG. 9 is a view showing the dependency of CNR on the phase shift of an optical pick up of Example 8.
Figure 10:
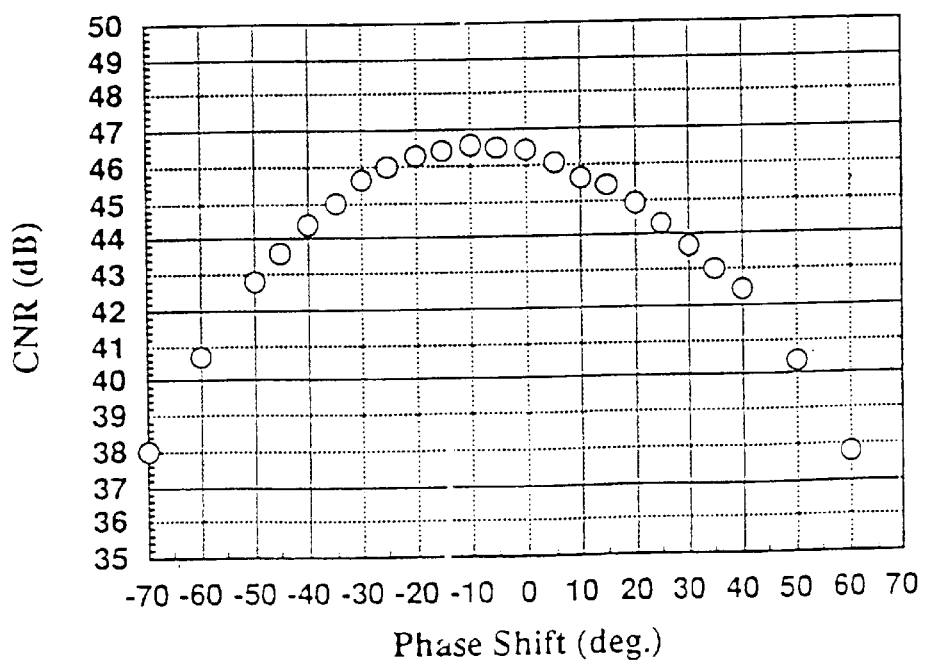
FIG. 10 is a view showing the dependency of CNR on the phase shift of an optical pick up of Example 9.
Figure 11:
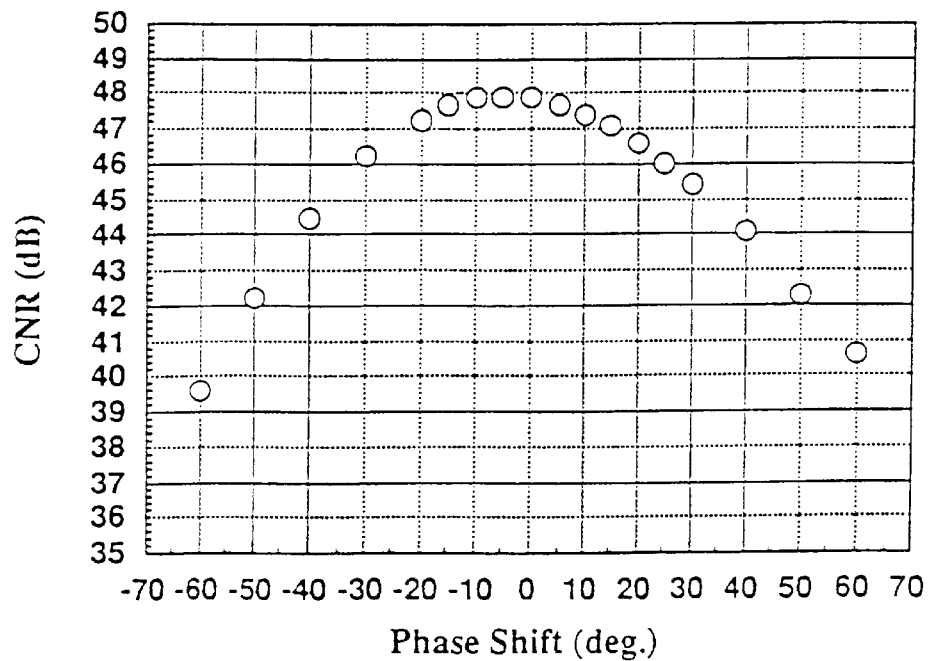
FIG. 11 is a view showing the dependency of CNR on the phase shift of an optical pick up of Example 10.
Figure 12:
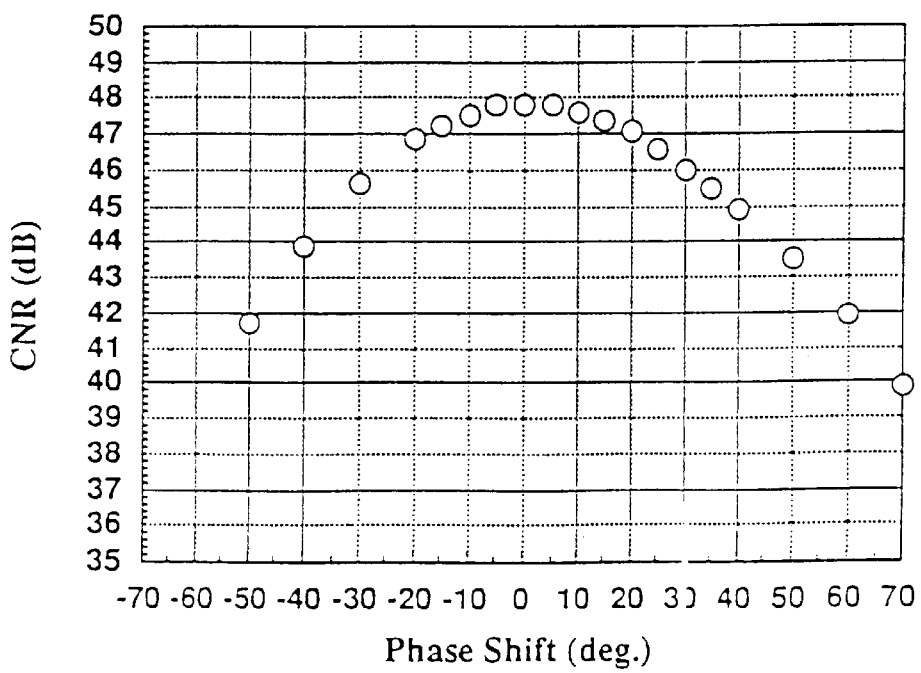
FIG. 12 is a view showing the dependency of CNR on the phase shift of an optical pick up of Example 11.
Figure 13:
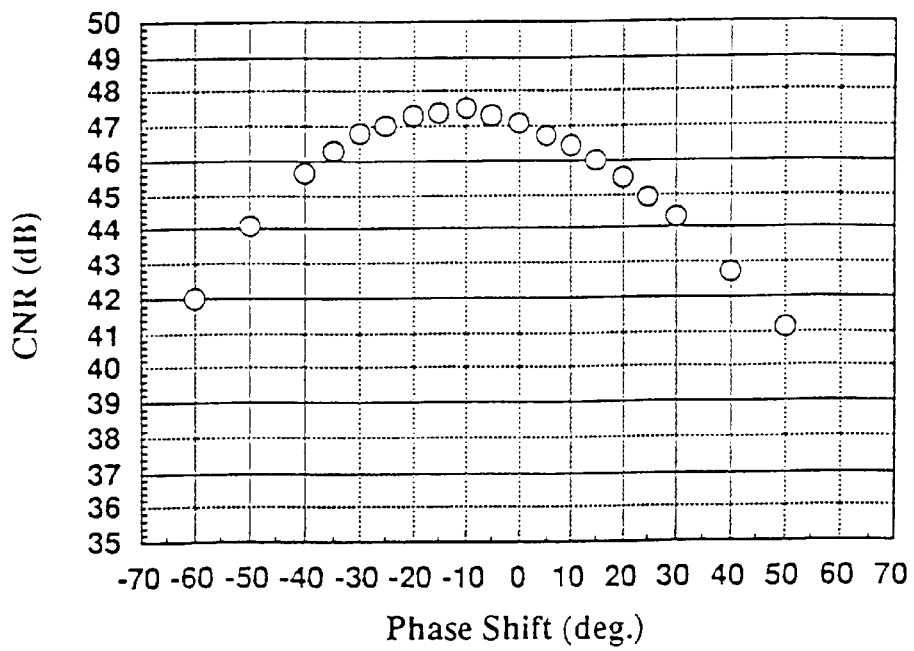
FIG. 13 is a view showing the dependency of CNR on the phase shift of an optical pick up of Example 12.
Figure 14:
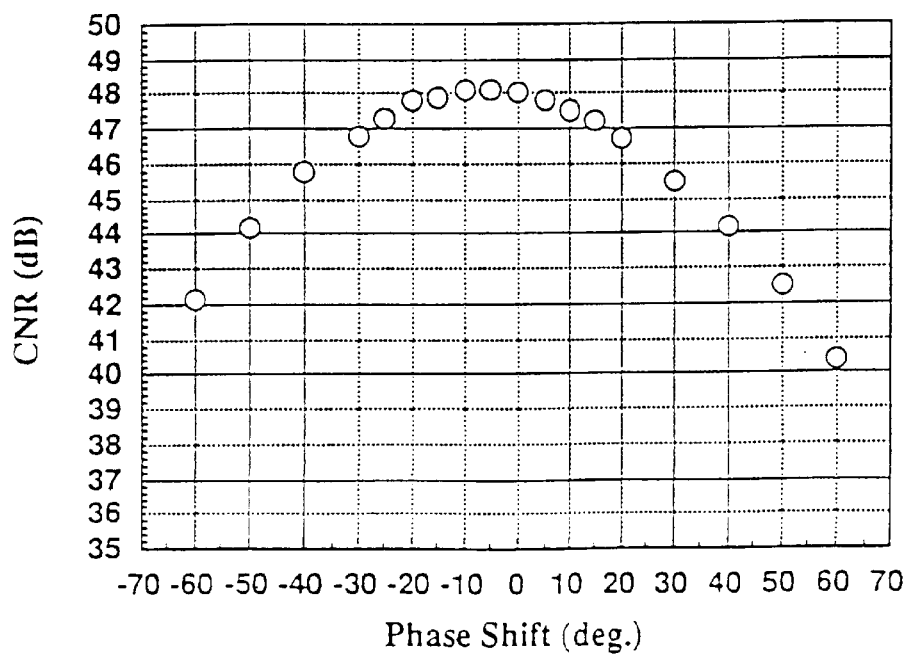
FIG. 14 is a view showing the dependency of CNR on the phase shift of an optical pick up of Example 13.
Figure 15:
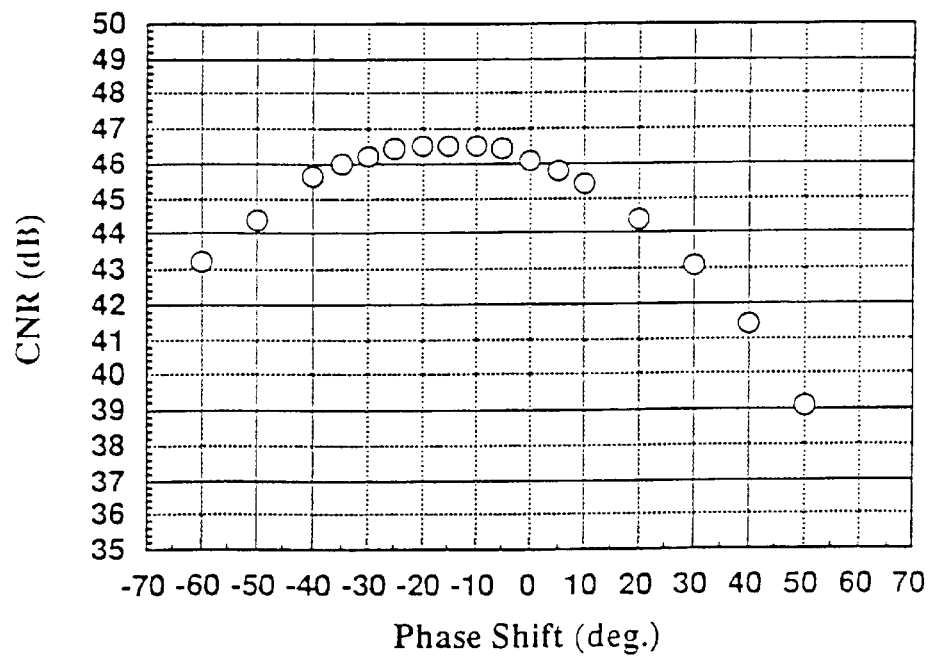
FIG. 15 is a view showing the dependency of CNR on the phase shift of an optical pick up of Example 14.
Figure 16:
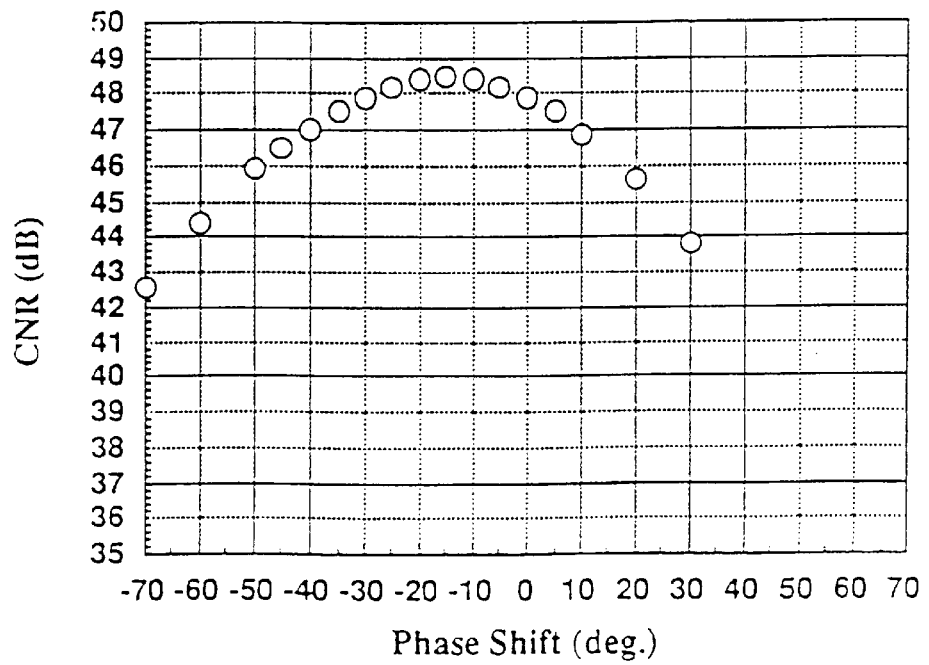
FIG. 16 is a view showing the dependency of CNR on the phase shift of an optical pick up of Comparative Example 2.
Figure 17:
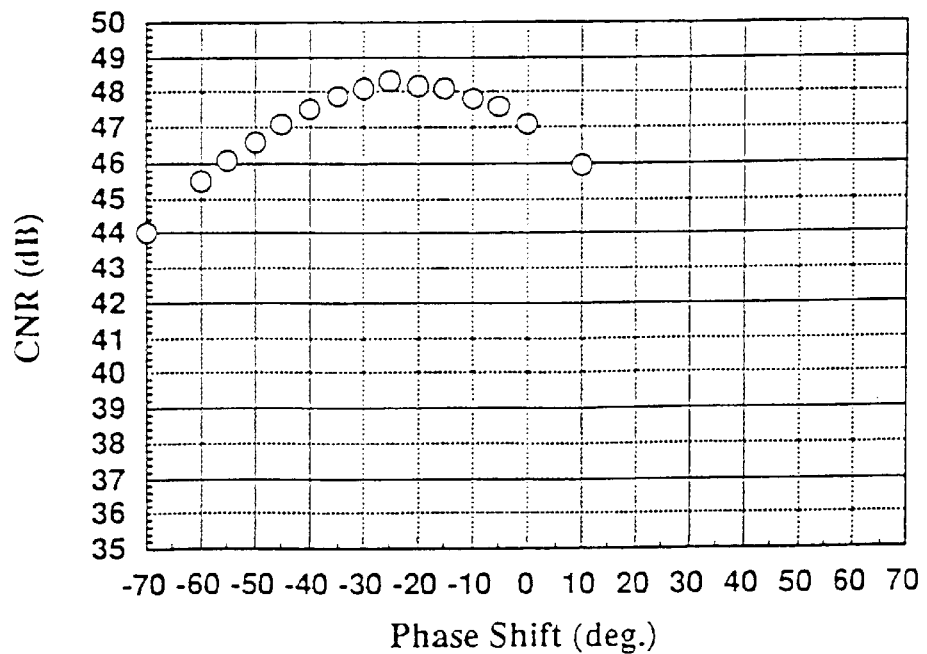
FIG. 17 is a view showing the dependency of CNR on the phase shift of an optical pick up of Comparative Example 3.
Figure 18:
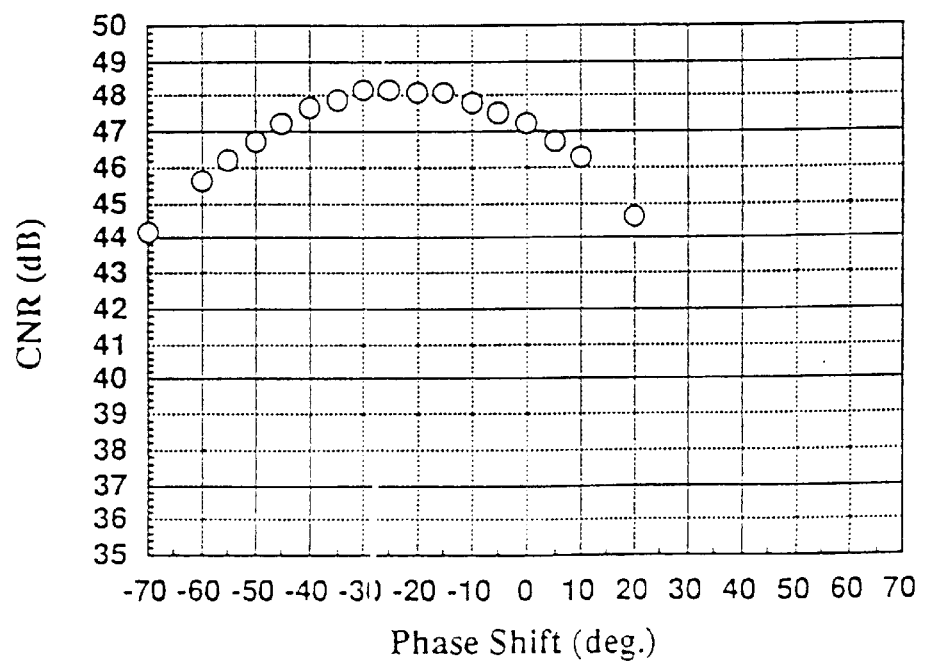
FIG. 18 is a view showing the dependency of CNR on the phase shift of an optical pick up of Comparative Example 4.

FIG. 2 shows the dependency of CNR on the phase shift of the optical pick up in a case where the phase shift of the medium $|\alpha+\beta+\gamma|$ is substantially 0. The peak of the maximum value of CNR substantially agrees to the pick up phase shift being 0.

It is evident from FIG. 2 that CNR which was the maximum when the phase shift was 0, decreased by about 0.5 dB when the phase shift was +15 degree, by about 1.0 dB when +20 degree, and by as much as 2 dB when +30 degree.

In the present invention, so long as the overall phase shift of the reflected light as the entire medium is within a range of $|\alpha+\beta+\gamma|\leq 20$ (degree), the decrease of CNR is little, and there will be no substantial problem from the viewpoint of the medium properties.

However, usually, an optical pick up of the drive also has its own phase shift. Accordingly, the overall phase shift is more preferably within a range of $|\alpha+\beta+\gamma|\leq 10$ (degree), so that a drive design can be made with certain flexibility. More preferably, the overall phase shift is $|\alpha+\beta+\gamma|\leq 5$ (degree).

Namely, usual optical pick ups of drives have some variations, and they usually have their own phase shifts of a level of +10 to 20 degree. Taking this into consideration, it is preferred that high CNR is obtained constantly within a range where the pick up phase shift is from −20 to +20 degree, i.e. it is not sufficient that high CNR is obtained only when the pick phase shift as shown in FIG. 2 is 0.

Thus, CNR sharply decreases as the pick up phase shift departs from the position being 0. Accordingly, it is preferred that $|\alpha+\alpha+\gamma|$ is brought as close as possible to 0, so that the peak of the maximum value of CNR is brought as close as possible to the pick up phase shift being 0.

Figure 1:
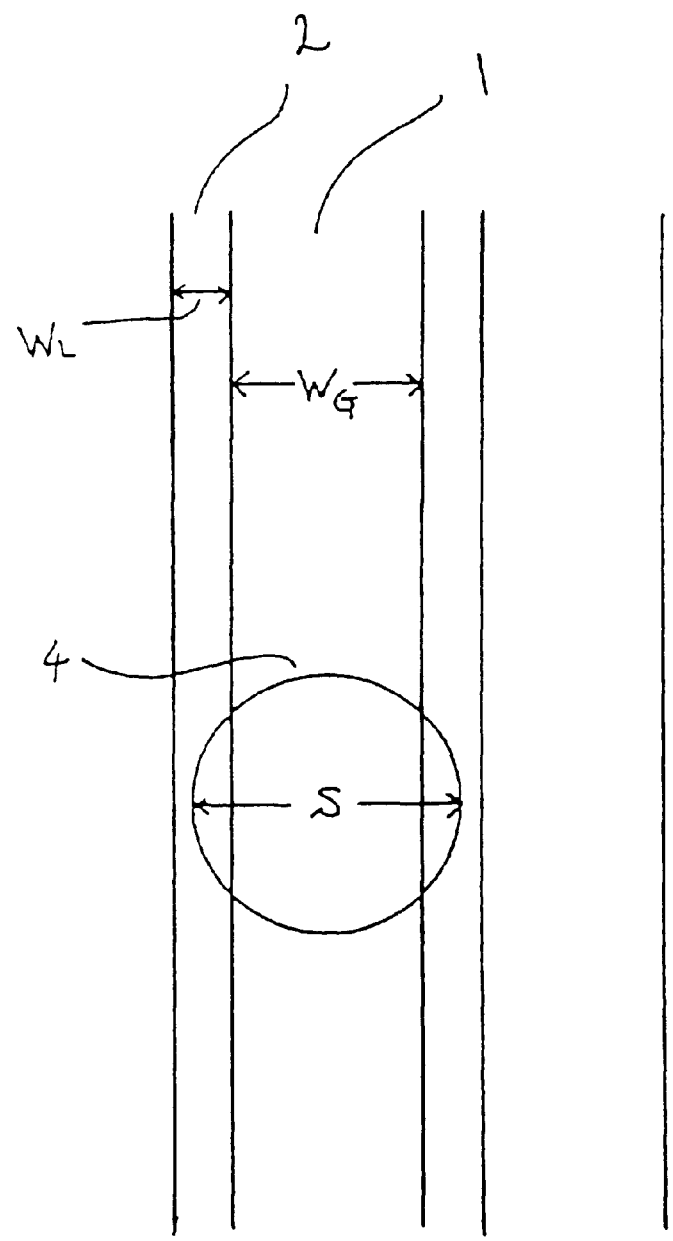
FIG. 1 is a view illustrating the mechanism for formation of a phase shift γ.
Figure 1:
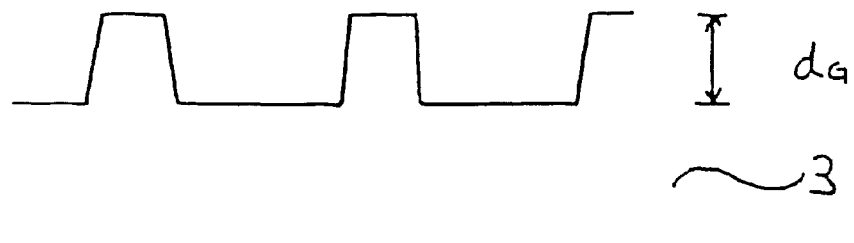

Now, referring to FIG. 1, the relation of the spot diameter S in a radial direction of the readout laser beam with the groove structure, will be described in further detail.

The readout laser beam is irradiated from the side where no groove is formed on the substrate 3. Accordingly, as viewed from the light source side, the 1 and 2 becomes concave, and the groove 1 becomes convex.

When the spot diameter S is smaller than the width Wa of the groove or the land on which writing is carried out, tracking tends to be difficult. Even if the laser beam deviates in a radial direction, so long as it is within the groove or the land on which writing is carried out, the quantity of diffracted light does not substantially change, and it is still difficult to obtain a tracking signal. Accordingly, the spot diameter S is preferably at least Wa.

Namely, when writing is carried out on the groove, it is preferred that $W_G\leq S$. Likewise, when writing is carried out on the land, it is preferred that $W_L\leq S$.

$Wa\leq 0.6S$ is particularly preferred, since the effect of the present invention is thereby remarkable.

When writing is carried out on the groove, the phase shift γ takes a negative value. On the contrary, when writing is carried out on the land, it takes a positive value. Accordingly, the sign of the phase shift $(\alpha+\beta)$ is preferably made to be positive when writing is carried out on the groove, and negative when writing is carried out on the land.

In the present invention, the shape of the groove is defined by values obtained by calculation taking it as a rectangular groove by an optical groove shape measuring method.

Firstly, a He-Ne laser beam (wavelength: 630 nm) is irradiated from the side of the substrate on which no groove is formed, and with respect to transmitted lights, intensity $I_0$ of zero-order diffracted light, intensity $I_1$ of primary diffracted light and intensity $I_2$ of secondary diffracted light, diffracted by the groove of the substrate, and the angles of the diffracted lights, are measured.

Where P is the track pitch, $W_G$ is the groove width, $d_G$ is the groove depth, n is the refractive index of the substrate, λ is the laser wavelength, and θ is the angel between the zero-order light and the primary light, when the groove is rectangular, $$P=\lambda/\sin\theta.$$

Further, the groove width and the groove depth can be calculated, as the following relations are satisfied:

$$I_2/I_1 = \cos^2(\pi\varepsilon)$$

$$I_1/I_0 = \{2\sin^2(\pi\varepsilon)(1-\cos\delta)\}/$$

$$[\pi^2\{1-2\varepsilon(1-\varepsilon)(1-\cos\delta)\}]$$

where, $$\varepsilon=W_G/P \text{ and } \delta=2(n-1)\pi d_G/\lambda$$

A real groove shape is not completely rectangular, but in the present invention, the groove shape is defined by values of the groove width and the groove depth determined straightforwardly by the above mentioned measuring method and calculation. Accordingly, the real groove structure may not necessarily be a completely rectangular shape.

As a result of the study by the present inventors, it has been found that where the width of the groove or the land on which writing is carried out, is represented by Wa, and the laser spot diameter is represented by S, the phase shift γ caused by the groove satisfies, in most cases, the relation represented by:

$$\gamma=+(141Wa/S-92)\pm 10$$

when writing is carried out on the groove, or by:

$$\gamma=-(141Wa/S-92)\pm 10$$

when writing is carried out on the land.

This tendency is particularly true when the groove depth $d_G$ is within a range of:

$d_G\leq 0.5\ \lambda/n$ where λ is the wavelength of the incident light in air, and n is the refractive index of the substrate. However, there is a tendency that as the groove depth becomes close to 0 or 0.25 λ/n, the servo signal amplitude tends to decrease, whereby the servo characteristics tend to be unstable.

Accordingly, the groove depth is more preferably 0.05 λ/n≦$d_G$≦0.21 λ/n or 0.29 λ/n≦$d_G$≦0.45 λ/n, still more preferably 0.11 λ/n≦$d_G$≦0.16 λ/n or 0.34 λ/n≦$d_G$≦0.39 λ/n.

Accordingly, in designing a medium, the overall phase shift $(\alpha+\beta+\gamma)$ as the entire medium can be brought close to 0 degree, by making the sum $(\alpha+\beta)$ of the phase shift α by the substrate and the phase shift β by the layer structure an opposite sign to the above γ.

Namely, it is preferred to select α, β, Wa and S so that the range represented by $$\alpha+\beta=-(141Wa/S92)\pm 10$$

is satisfied when writing is carried out on the groove, or the range represented by:

$$\alpha+\beta=+(141Wa/S-92)\pm10$$

is satisfied when writing is carried out on the land.

With respect to the groove shape in the case of writing on the groove, in a high density recording medium, the track pitch is usually from 0.1 to 2.0 μm, preferably from 0.6 to 1.0 μm, and the groove width is usually from 0.01 to 1.5 μm, preferably from 0.4 to 0.8 μm. The groove depth is usually from 10 to 500 nm, preferably from 20 to 250 nm, particularly preferably from 40 to 80 nm or from 120 to 160 nm.

In a conventional medium of writing on the land type having a relatively low recording density, the cross sectional shape in a radial direction is of a letter V-type. Whereas, in a medium of writing on the groove type, the cross sectional shape is of a letter U-type or substantially rectangular.

In the present invention, writing is carried out on the groove or the land only. However, for the following reason, it is preferred to write on the groove.

As mentioned above, to prepare a stamper for production of substrates, a photoresist is coated on a glass plate and subjected to exposure by a laser beam.

To form a rectangular groove, the photoresist is sensitized and removed to the bottom thereof, and the precise flat surface of the glass plate becomes the flat portion of the groove. On the other hand, at the land portion, the surface of the photoresist is transferred as it is, and the land portion accordingly has fine irregularities attributable to the photoresist particles, which tend to cause a noise.

Accordingly, it is preferred to carry out writing on the groove, whereby a noise in the readout signal can be controlled to a low level.

In conventional magneto-optical disks, it has been believed advisable that the phase shifts caused by the substrate and by the layer structure should be brought as close as possible to 0. However, in the present invention, it becomes possible to reduce the overall phase shift rather by positively creating phase shifts here.

Here, the adjustment of the phase shift can be made by either one of shifts α and β. However, the phase shift α attributable to birefringence tends to increase the noise. Accordingly, it is preferred that α is brought as close as possible to 0, and β is adjusted.

A usual magneto-optical recording medium is of a four layer structure having a protective layer, a writing layer, an interference layer and a reflective layer sequentially formed on a substrate. Usually, the protective layer and the interference layer are made of a transparent dielectric, the recording layer is made of a magnetic material, and the reflective layer is made of a metal having high reflectivity. In the case of writing on the groove, preferred are $\lambda/6 \geq d1 \geq \lambda/12$ $\lambda/18 \geq d2 \geq \lambda/27$ $\lambda/12 \geq d3 \geq \lambda/60$, more preferred are $\lambda/7 \geq d1 \geq \lambda/11$ $\lambda/19 \geq d2 \geq \lambda/26$ $\lambda/13 \geq d3 \geq \lambda/50$ where d1 is the thickness of the protective layer, d2 is the thickness of the writing layer, d3 is the thickness of the interference layer, and λ is the wavelength in air of the readout beam.

Each layer may be composed of a plurality of layers. In such a case, d1, d2 or d3 represents a total thickness of such a plurality of layers. For example, when the magnetic layer is composed of two layers, d2 represents the total thickness of the two layers.

The protective layer and the interference layer are made of a transparent dielectric, preferably silicon nitride, tantrum oxide, silicon oxide, aluminum nitride, zinc sulfide or a composite thereof. The real number portion n1 of the refractive index is preferably from 1.8 to 2.4, and the imaginary number portion k1 thereof is preferably substantially 0.

The writing layer is made of a magnetic material showing a magneto-optical effect, preferably an alloy of rare-earth and transition metal, more preferably an alloy comprising at least one of Tb, Gd and Dy and at least one of Fe and Co. Most preferred is TbFeCo or GdFeCo. The real number portion n2 of the refractive index is preferably from 2.0 to 4.0, and the imaginary number portion k2 thereof is preferably from 2.0 to 4.0.

The reflective layer is made of a metal having high reflectivity, preferably Al, Au, Ag, Cu or such a metal as a base having at most about 10% of e.g. Ti, Cr, Ta, Zr, V, Pt or Mo incorporated thereto. From the viewpoint of costs and corrosion resistance, it is further preferred to use Al as the base. The real number portion n3 of the refractive index is preferably from 0.5 to 2.0, and the imaginary number portion k3 thereof is preferably from 3.0 to 8.0.

Preferably, a protective coating made of e.g. an ultraviolet ray-curable resin, is applied on these layers.

As the substrate, various types may be used so long as they have transparency such as plastics or glass. However, from the efficiency for forming a groove by molding, a plastic is preferred. Particularly from the viewpoint of costs, a polycarbonate resin is preferred, and an amorphous polyolefin having a small birefringence and a good flattening property, is preferred.

Now, a case where a light is irradiated from the film surface side, will be described.

When a light is irradiated from the film surface side, the laser beam will not pass through the substrate. Accordingly, the phase shift α attributable to the birefringence of the substrate will be no problem. Therefore, when a light is irradiated from the film surface side, the phase shift β by the layer structure may be made to have an opposite sigh to the phase shift γ. Namely, the total of the phase shifts β and γ is brought as close as possible to 0.

Specifically, $|\beta+\gamma| \leq 20$ (degree), preferably $|\beta+\gamma| \leq 10$ (degree), more preferably $|\beta+\gamma| \leq 5$ (degree).

Further, the mode relating to the phase shift can be understood by substituting "β" for "α+β" in the above mentioned case where a light is irradiated from the substrate side.

Further, when a light is irradiated from the film surface side, the light does not pass through the substrate, and the wavelength of the incident light does not change depending on the refractive index of the substrate and will be the wavelength λ in air itself. Accordingly, in this case, the groove depth dG is preferably $dG \leq 0.5 \lambda$, more preferably $0.05 \lambda \leq dG \leq 0.21 \lambda$ or $0.29 \lambda \leq dG \leq 0.45 \lambda$, still more preferably $0.11 \lambda \leq dG \leq 0.16 \lambda$ or $0.34 \lambda \leq dG \leq 0.39 \lambda$.

Further, the mode relating to the wavelength of the incident light can be understood by substituting "λ" for "λ/n" in the above mentioned case where a light is irradiated from the substrate side.

With respect to the layer structure of a usual magneto-optical recording medium in the case where a light is irradiated from the film surface side, a reflective layer, an interference layer, a writing layer and a protective layer are formed in this order on a substrate. To protect these layers from collision or friction with an optical head, it is preferred to further provide a protective layer or a lubricant layer thereon. Other modes are basically the same as in the case where a light is irradiated from the substrate side.

Further, since the light will not pass through the substrate, the material of the substrate is not required to have transparency or low birefringence. Accordingly, in addition to the material disclosed for the above mentioned case where a light is irradiated from the substrate side, a plastic having a high birefringence such as a liquid crystal polymer, a non-transparent plastic or a metal may also be used.

Other modes are basically the same as in the case where a light is irradiated from the substrate side.

Now, the present invention will be described in further detail with reference to Examples. However, it should be understood that the present invention is by no means restricted to such specific Examples.

The groove depth and the groove width of a substrate were measured by an optical groove-shape measuring method. Further, the wavelength $\lambda$ of the laser beam used for evaluation was 680 nm, and the diameter in a radial direction of the spot of the laser beam was 1.15 $\mu$m.

EXAMPLE 1

A polycarbonate having an average molecular weight Mv of 15,000 was injection-molded at a mold temperature of 125° C. and at a resin temperature of 350° C. to obtain a polycarbonate substrate having a groove formed to have a groove depth of 55 nm, a groove width of 0.6 $\mu$m, a land width of 0.3 $\mu$m and a track pitch of 0.9 $\mu$m. The cross section in a radial direction of the groove was substantially rectangular.

This substrate had a thickness of 1.2 mm, a refractive index of 1.58, a vertical birefringence of $451 \times 10^{-6}$ and a lateral birefringence of $23.4 \times 10^{-6}$, and the angle between the main axis of the lateral birefringence and the plane of polarization of the incident light, was 4°. The phase shift $\alpha$ by the substrate was substantially +10°.

On this substrate, a protective layer, a writing layer, an interference layer and a reflective layer were sequentially formed by sputtering to obtain sample 1. Namely, sequentially from the substrate side, 85 nm of tantrum oxide, 28 nm of TbFeCo, 33 nm of silicon nitride and 100 nm of AlTa were formed sequentially. The respective layer thicknesses correspond to $\lambda/8$, $\lambda/24$, $\lambda/21$ and $\lambda/7$, respectively. The phase shift $\beta$ by such a layer structure was +25°.

With a laser beam for evaluation, the groove of the sample was scanned, whereby the phase shift $\gamma$ by interference of the reflected lights (0-order reflected lights) from the groove and from the land, with each other, was about −35°.

Accordingly, the phase shift $\alpha+\beta$ was +35°, and the sum of the phase shifts by the substrate, the layer structure and the groove i.e. $|\alpha+\beta+\gamma|$, as substantially 0°.

A signal of a mark length of 0.55 $\mu$m was written on the groove of this medium and readout, whereby the maximum value of CNR was 49.5 dB.

COMPARATIVE EXAMPLE 1

The same substrate as in Example 1 was prepared, and in the same manner as in Example 1, 85 nm of tantalum oxide, 21 nm of TbFeCo, 15 nm of silicon nitride and 75 nm of AlTa were formed to obtain sample 2. The respective layer thicknesses correspond to $\lambda/8$, $\lambda/32$, $\lambda/45$ and $\lambda/9$, respectively. The phase shift by such a layer structure was −5°.

With a laser beam for evaluation, the groove of the sample was scanned, whereby the phase shift by interference of the reflected lights (0-order reflected lights) from the groove and from the land, with each other, was about −35°.

Thus, the phase shift $\alpha+\beta$ was +5°, and the sum of the phase shifts by the substrate, the layer structure and the groove, i.e. $|\alpha+\beta+\gamma|$, was −30°.

A signal having a mark length of 0.55 $\mu$m was written on the groove of this medium and readout, whereby the maximum value of CNR was 47.2 dB.

As described above, in Example 1, as compared with Comparative Example 1, the phase shift caused by the groove, was complemented by the substrate and the layer structure, whereby an effect of improving the CNR characteristics by at least 2 dB, was obtained.

EXAMPLES 2 TO 14 AND COMPARATIVE EXAMPLES 2 TO 4

Under the same conditions as in Example 1, a polycarbonate was injection-molded to obtain a substrate having a groove formed to have the groove width and the groove depth as identified in Table 1. The track pitch was 0.85 $\mu$m in all cases. The cross section in a radial direction of the groove was substantially rectangular.

This substrate had a thickness of 1.2 nm, a refractive index of 1.58, a vertical birefringence of about $400 \times 10^{-6}$ and a lateral birefringence of about $10 \times 10^{-6}$, and the angle between the main axis of the lateral birefringence and the plane of polarization of the incident light, was 4°.

On this substrate, a protective layer, a recording layer, an interference layer and a reflective layer were formed sequentially by sputtering. Namely, from the substrate side, 75 nm of tantrum oxide, 32 nm of TbFeCo, 26 nm of silicon nitride and from 30 to 150 nm of AlTa were formed sequentially to obtain samples 3 to 15. The thickness of the reflective layer was varied depending upon the groove shape so that the sensitivity was optimized. The respective layer thicknesses were $\lambda/9$, $\lambda/21$, $\lambda/26$ and $\lambda/23$ to $\lambda/4.5$, respectively.

On the other hand, from the substrate side, 75 nm of tantrum oxide, 21 nm of TbFeCo, 21 nm of silicon nitride and from 30 to 150 nm of AlTa were formed sequentially to obtain samples 16 to 18. The respective layer thicknesses were $\lambda/9$, $\lambda/32$, $\lambda/32$ and $\lambda/23$ to $\lambda/4.5$, respectively.

Table 1 shows the phase shift $\alpha$ by the substrate, the phase shift $\beta$ by the layer structure and $\alpha+\beta$ of each sample.

With a laser beam for evaluation, the groove of the sample was scanned. The phase shift $\gamma$ by interference of reflected lights (0-order reflected lights) from the groove and from the land, with each other, is shown in Table 1. Further, $(\alpha+\beta)_{comp}$ obtained by the following formula:

$$(\alpha+\beta)_{comp} = -(141Wa/S-92) \text{ (degree)}$$

is also shown in Table 1.

Further, a signal having a mark length of 0.53 $\mu$m was written on the groove of each sample and readout by an optical pick up for evaluation, whereby the dependency of CNR on the pick up phase shift, was evaluated. The respective results are shown in FIGS. 3 to 18.

With samples wherein the absolute value of the sum of the phase shifts i.e. $|\alpha+\beta+\gamma|$ is large, such as samples 16, 17 and 18, the pick up phase shift at which CNR became the maximum, was substantially deviated from the position of 0°, and within the range of ±10 to 20°, CNR varied substantially. In such a case, it is likely that during readout by a drive, the inherent phase shift of the pick up of the drive is added, whereby CNR tends to substantially decrease.

TABLE 1

| | Groove shape | | Measured values of phase shifts | | | | | |
|---|---|---|---|---|---|---|---|---|
| | | | Phase shift by | Phase shift by | Sum of phase shifts by the substrate and | Phase shift caused by | Total of | |
| Sample No. | Groove depth da (nm) | Groove width Wa (μm) | the substrate α (deg.) | the layer structure β (deg.) | the layer structure α + β (deg.) | the groove γ (deg.) | all phase shifts α + β + γ (deg.) | (α + β)$_{comp}$ (deg.) |
| Ex. 2 | 3 | 58 | 0.57 | 11.1 | 19.2 | 30.3 | −23.3 | 7.0 | 22.6 |
| Ex. 3 | 4 | 62 | 0.58 | 3.2 | 18.7 | 21.9 | −21.9 | 0.0 | 21.3 |
| Ex. 4 | 5 | 63 | 0.56 | 6.3 | 19.5 | 25.8 | −19.9 | 5.9 | 23.3 |
| Ex. 5 | 6 | 68 | 0.60 | 0.0 | 16.1 | 16.1 | −18.1 | −2.0 | 18.2 |
| Ex. 6 | 7 | 63 | 0.61 | 2.1 | 18.9 | 21.0 | −14.8 | 6.2 | 16.7 |
| Ex. 7 | 8 | 67 | 0.58 | 8.6 | 17.8 | 26.4 | −26.0 | 0.4 | 20.8 |
| Ex. 8 | 9 | 68 | 0.60 | −0.2 | 16.5 | 16.3 | −18.2 | −1.9 | 18.3 |
| Ex. 9 | 10 | 61 | 0.52 | 7.3 | 15.4 | 22.7 | −27.1 | −4.4 | 28.0 |
| Ex. 10 | 11 | 52 | 0.56 | 7.6 | 18.7 | 26.3 | −21.6 | 4.7 | 23.2 |
| Ex. 11 | 12 | 54 | 0.57 | 8.4 | 18.8 | 27.2 | −19.5 | 7.7 | 21.6 |
| Ex. 12 | 13 | 54 | 0.55 | 0.0 | 18.7 | 18.7 | −23.4 | −4.7 | 24.8 |
| Ex. 13 | 14 | 64 | 0.56 | 3.3 | 19.6 | 22.9 | −26.1 | −3.2 | 24.0 |
| Ex. 14 | 15 | 65 | 0.51 | 1.0 | 18.1 | 19.1 | −33.4 | −14.3 | 29.2 |
| Comp. Ex. 2 | 16 | 55 | 0.62 | 8.6 | −11.0 | −2.4 | −17.2 | −19.6 | 16.5 |
| Comp. Ex. 3 | 17 | 54 | 0.63 | 6.2 | −15.5 | −9.3 | −17.7 | −27.0 | 14.3 |
| Comp. Ex. 4 | 18 | 52 | 0.60 | 5.2 | −14.5 | −9.3 | −17.0 | −26.3 | 18.1 |

Good CNR characteristics can be obtained by employing a magneto-optical recording medium having the phase shift complemented as in the present invention and its writing and readout method. In particular, high CNR at a level of at least 45 dB, or even as high as at least 47 dB, can be obtained constantly within a wide range of the pick up phase shift.

What is claimed is:

1. A magneto-optical recording medium having a writing layer formed on a transparent substrate provided with a groove having a flat bottom surface and a flat land, so that writing or readout is carried out on either the groove or the land only by irradiating a laser beam from the substrate side, wherein the sum (α+β) of a phase shift α of a reflected light of a readout beam by the substrate and a phase shift β thereof by a layer structure on the transparent substrate, is made to have an opposite sign to a phase shift γ by interference of reflected lights from the groove and the land.

2. The magneto-optical recording medium according to claim 1, wherein Wa≦S, where Wa is the width of the groove or the land on which writing is carried out, and S is the diameter in a radial direction of the spot of a readout laser beam (here the spot is meant for an area with at least 1/e² of the peak intensity of the laser beam).

3. The magneto-optical recording medium according to claim 1, wherein α+β (degree) is made to be within a range of:

+(−141Wa/S+92)−10≦α+β≦+(−141Wa/S+92)+10 in a case where writing is carried out on the groove, or within a range of:

−(−141Wa/S+92)−10≦α+β≦+(−141Wa/S+92)+10 in a case where writing is carried out on the land, where Wa is the width of the groove or the land on which writing is carried out, and S is the diameter in a radial direction of the spot of a readout laser beam (here the spot is meant for an area with at least 1/e² of the peak intensity of the laser beam).

4. The magneto-optical recording medium according to claim 3, wherein the groove depth dG satisfies:

dG≦0.5 λ/n where λ is the wavelength of the laser beam (the wavelength in air), and n is the refractive index of the substrate.

5. The magneto-optical recording medium according to claim 1, wherein writing is carried out on the groove.

6. The magneto-optical recording medium according to claim 5, wherein a protective layer, the writing layer, an interference layer and a reflective layer are formed in this order on the transparent substrate, and λ/6≧d1≧λ/12

λ/18≧d2≧λ/27

λ/12≧d3≧λ/60 where d1 is the thickness of the protective layer, d2 is the thickness of the writing layer, d3 is the thickness of the interference layer, and λ is the wavelength of the readout beam (the wavelength in air).

7. A writing and readout method for a magneto-optical recording medium having a writing layer formed on a transparent substrate provided with a groove having a flat bottom surface and a flat land, wherein writing is carried out on either the groove or the land only, and the sum of a phase shift of a reflected light by a layer structure on the transparent substrate and a phase shift of a reflected light by the substrate, is made to have an opposite sign to a phase shift by interference of reflected lights from the groove and the land, and wherein a readout laser beam is used which satisfies Wa≦S, where Wa is the width of the flat portion of the groove or the land on which writing is carried out, and S is the diameter in a radial direction of the spot of a readout laser beam (here the spot is meant for an area with at least 1/e² of the peak intensity of the laser beam).

8. A magneto-optical recording medium having a writing layer formed on a substrate provided with a groove having a flat bottom surface and a flat land, so that writing or readout is carried out on either the groove or the land only by irradiating a laser beam from the writing layer side, wherein a phase shift β of a reflected light of a readout beam by a layer structure on the substrate, is made to have an opposite sign to a phase shift γ by interference of reflected lights from the groove and the land.

9. The magneto-optical recording medium according to claim 8, wherein Wa≦S, where Wa is the width of the groove or the land on which writing is carried out, and S is the diameter in a radial direction of the spot of a readout laser beam (here the spot is meant for an area with at least $1/e^2$ of the peak intensity of the laser beam).

10. The magneto-optical recording medium according to claim 8, wherein β (degree) is made to be within a range of:

+(−141Wa/S+92)−10≦β≦+(−141Wa/S+92)+10 in a case where writing is carried out on the groove, or within a range of:

−(−141Wa/S+92)−10≦β≦−(−141Wa/S+92)+10 in a case where writing is carried out on the land, where Wa is the width of the groove or the land on which writing is carried out, and S is the diameter in a radial direction of the spot of a readout laser beam (here the spot is meant for an area with at least $1/e^2$ of the peak intensity of the laser beam).

11. The magneto-optical recording medium according to claim 10, wherein the groove depth dG satisfies:

dG≦0.5 λ where λ is the wavelength of the laser beam (the wavelength in air).

12. The magneto-optical recording medium according to claim 8, wherein writing is carried out on the groove.

13. The magneto-optical recording medium according to claim 12, wherein a reflective layer, an interference layer, the writing layer and a protective layer are formed in this order on the substrate, and λ/6≧d1≧λ/12

λ/18≧d2≧λ/27

λ/12≧d3≧λ/60 where d1 is the thickness of the protective layer, d2 is the thickness of the writing layer, d3 is the thickness of the interference layer, and λ is the wavelength of the readout beam (the wavelength in air).

14. A writing and readout method for a magneto-optical recording medium having a writing layer formed on a substrate provided with a groove having a flat bottom surface and a flat land, wherein writing is carried out on either the groove or the land only, and a phase shift of a reflected light by a layer structure on the substrate, is made to have an opposite sign to a phase shift by interference of reflected lights from the groove and the land, and wherein a readout laser beam is used which satisfies Wa≦S, where Wa is the width of the flat portion of the groove or the land on which writing is carried out, and S is the diameter in a radial direction of the spot of a readout laser beam (here the spot is meant for an area with at least $1/e^2$ of the peak intensity of the laser beam).

* * * * *

UNITED STATES PATENT AND TRADEMARK OFFICE
CERTIFICATE OF CORRECTION

PATENT NO. : 5,970,027

DATED : October 19, 1999

INVENTOR(S): Kyuya NARITA, et al.

It is certified that an error appears in the above-identified patent and that said Letters Patent is hereby corrected as shown below:

On the title page, item [75], the first inventor's name should be:

--Kyuya Narita--

Signed and Sealed this

Third Day of April, 2001

*Attest:*

NICHOLAS P. GODICI

*Attesting Officer*    *Acting Director of the United States Patent and Trademark Office*